Aug. 21, 1934.  K. A. HOLST  1,971,141
SYSTEM OF SPEED CONTROL
Filed March 30, 1933
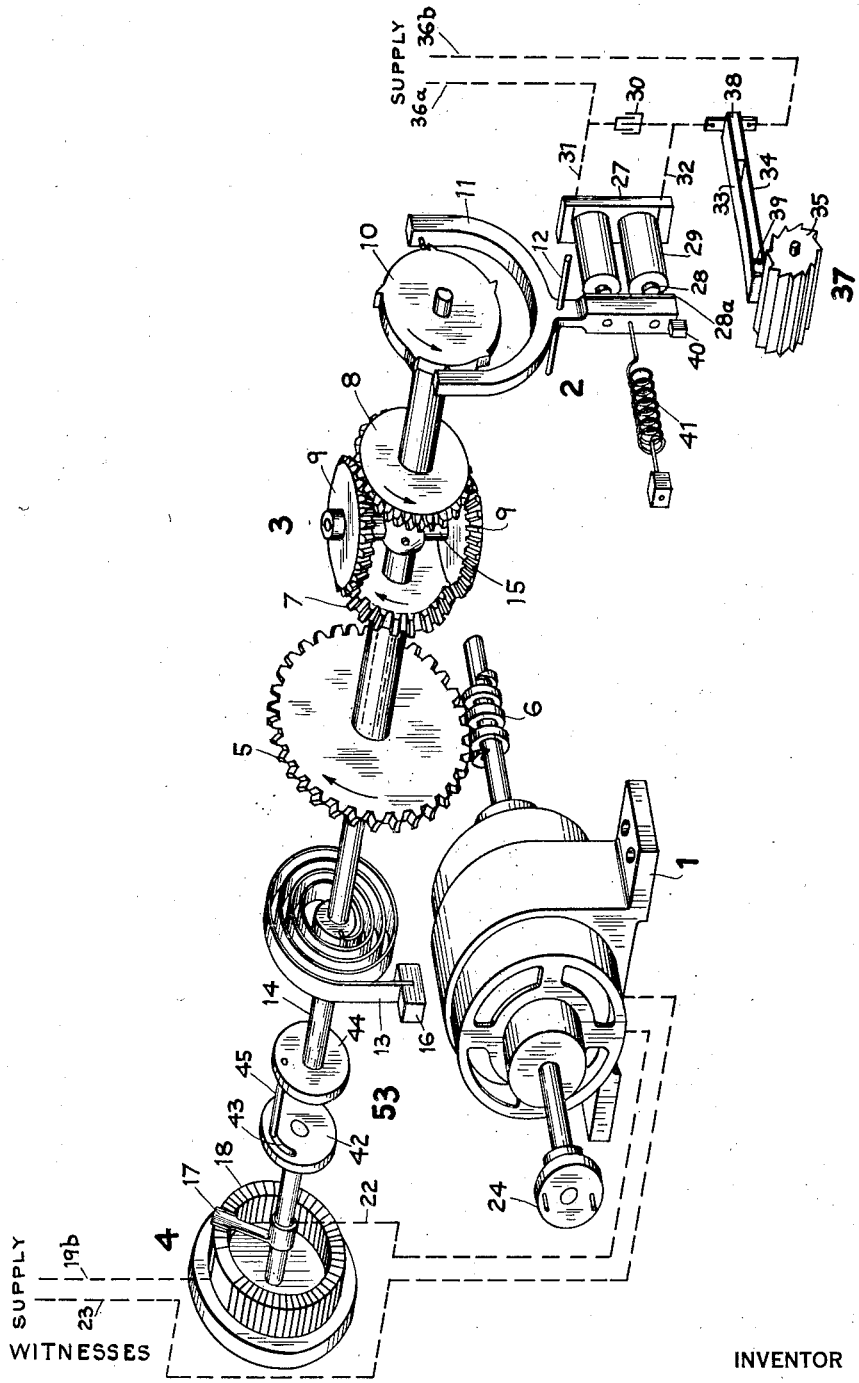
WITNESSES
INVENTOR Patented Aug. 21, 1934

1,971,141

UNITED STATES PATENT OFFICE 1,971,141

SYSTEM OF SPEED CONTROL

Knute Arnold Holst, Long Island City, N. Y.

Application March 30, 1933, Serial No. 663,487

2 Claims. (Cl. 172—293)

My invention relates to mechanisms for the control of the speed of rotary apparatus in accordance with the movement of some master device and in one of the embodiments here shown, in accordance with the sequence of a series of successive impulses. My invention has the advantage that the control of the rotary apparatus may be accomplished without any transfer of energy from the controlling means and will be effective for governing working devices of large power from a control system operating on a very small supply of energy.

My invention operates through a differential action set up between the actual speed of the work apparatus and the speed of the control system, of whatever type this may be. When the two speeds correspond the differential device does not operate, but if the position of the work apparatus advances relatively to that of the control means, the differential device moves forward and actuates means for retarding the speed of the work apparatus. Similarly if the work apparatus falls behind the control, the differential device falls behind and actuates the means for accelerating the work apparatus.

It is sometimes necessary to use as a control device an apparatus which has very little energy or one in which the extraction of a small amount of energy for control purposes would disturb its regime and my invention provides a scheme in which only the smallest amount of energy is required of the control device: or I may use a somewhat simpler scheme in which the control system may directly assist in operating the control mechanism of the work circuit.

My control may take the form of imposing upon the controlled rotary system a speed of operation varying to meet some special requirement or it may be used to secure constant speed under unfavorable conditions as, for example, in an electric motor where the power supply conditions for the motor are subject to variations, such as, variations of voltage.

My invention will be understood from the drawing, in which I show an effective embodiment of my invention.

In this figure, I show a system for controlling the speed of an electric motor driving a work system, to correspond to the total and average movement of a master system which advances by steps. For example, I may use this system to drive the electric motor of an apparatus for transmitting to several distant stations on a ship the indications of the distance covered by the vessel, obtained through an integrating device which summates into revolutions of a shaft the total movement of an integrating lever which acts at regular intervals on a cam which is positioned by a speed indicator. The revolutions of the summating shaft acting through a toothed wheel cause a series of impulses of equal strength, approximately, but occurring at intervals inversely proportional to the speed of the vessel. The motor of the signal transmitting device operates continuously and with only more or less gradual and continuous speed variations. It is evident that by using these impulses to operate the control means, the motor driving the work system will run at a speed which is directly proportional to the average frequency of the separate impulses of the control circuit, and therefore proportional to the speed of the vessel.

The motor driving the transmitting system is shown at 1, the receiving device actuating the control system in answer to the impulses is shown at 2, the differential device, at 3, and the means for controlling the speed of the motor, namely an adjustable series resistance, at 4. The motor, 1, drives the transmitting apparatus or work system by a shaft extension at 24, and also drives a worm gear wheel, 5, by means of a worm, 6. On one side of this worm gear wheel, 5, is carried one of the main wheels, 7, of the differential gear system, 3, of the well known bevel gear type, the other main wheel being at 8. Two small pinions, 9, mesh with the bevel gear wheels, 7 and 8, and are carried on a cross-shaft, 15. Through the hubs of the bevel gear wheels, 7 and 8, runs a shaft, 14, to which the cross-shaft, 15, is secured and on which the wheels, 7 and 8, are free to turn. This shaft, 14, is extended in one direction and actuates a circular contact type rheostat, 4, the arm, 17, of the rheostat being driven by the shaft, 14, while the main portion is fixed in position. The shaft, 14, further, is steadily urged to revolve in the direction shown by the arrow on the main wheel, 8, by a spring, 13, secured to a fixed block, 16. The shaft, 14, is mounted in suitable bearings, not shown, in the usual way. An escape wheel, 10, operating with an oscillating lever, 11, pivoted at 12 and actuated by the device 2, is mounted at the other end of the system from the rheostat, on the bevel gear wheel, 8.

The wheel, 37, is the toothed wheel referred to above revolving at an average rate determined by the summated impulses representing the speed of the vessel and its run. As this wheel, 37, provided with teeth, 35, turns, the two springs, 33 and 34, are periodically displaced by the teeth 35, one after the other, so that the two contacts, 39, are made to close and open as the teeth of the wheel pass, one closure for each tooth passage, the springs, 33 and 34, being mounted on the insulating block, 38. The spring, 34, is connected to one side of the supply, 36b, while the other side 36a, is connected through the wire, 31, to one end of the electromagnet coils, 29, on the core, 28, of the electromagnet, 27, in the device 2. The other end of the coils, 29, is connected through the wire, 32, to the spring, 33. The armature, 28a, of the electromagnet is connected to the lever, 11, so that it is attracted towards the core, 28, when the coils are energized or drawn back against the stop, 40, by the spring, 41, when the coils are deenergized. Thus an impulse in the wires, 31 and 32, from the springs, 33 and 34, on the rotation of the toothed wheel, 37, will attract and release the armature, 28a, and allow the wheel, 10, to move one whole tooth, this movement being in two steps corresponding to the two arms on lever, 11, one step on the energizing of the coils, 29, and the other on their deenergizing. The lever, 11, is pivoted at 12 and thus serves to permit the magnet to operate the escapement. A static condenser, 30, is connected across the wires, 31 and 32, to control the tendency of a spark to form at the contacts, 39.

In this system the motor, 1, in addition to driving the work apparatus, drives the worm gear wheel, 5, with a continuous motion but at a much less speed than the motor. On the other hand the device, 2, actuates the lever, 11, at intervals, as impulses are received from the apparatus for integrating the vessel's speed and causes the escapement to operate to permit the spring, 13, to turn the wheel, 8, intermittently but continually in the direction shown by the arrow. It will be seen that when the wheel, 7, turns without there being any motion in the wheel, 8, the bevel pinions, 9, turning on the cross-shaft, 15, will move in the same direction at half the velocity and also that in so far as the wheel, 8, moves without motion of the wheel, 7, the pinions, 9, will move in the same direction as the wheel, 8, but opposite to their previous direction. If now both wheels, 7 and 8, move at once the pinions, 9, will move in proportion to the difference in the speeds of the two wheels. In case the two wheels move at the exact same speed, the pinions, 9, will turn on the cross-shaft, 15, but will not move the shaft, 14, and under this condition the desired relation between the speed of the control device and the work system is being maintained. The rheostat, 4, is so connected to the motor, 1, that when an excessive speed in the motor tends to turn the pinions, 9, and the cross-shaft, 15, and consequently the shaft, 14, and the rheostat arm, 17, through the differential action, the effect will be to reduce the speed of the motor and vice-versa. As a result, the rheostat, 4, is at all times being readjusted to correct the speed of the motor, except when the speed happens to be exactly in consonance with the frequency of the impulses of the device 2. The rheostat, 4, has its winding, 18, connected between the supply wire, 19b, and one terminal of the motor through the wire, 22, and the other supply wire, 23, is connected directly to the other motor terminal. On account of the continuous corrective effect of the resistance, 4, on the speed of motor, 1, the tension of the spring, 13, varies only a small amount.

As the action of the escape wheel, 10, is necessarily intermittent, there can never be a continuous equality between the speeds of the two wheels, 7 and 8, but as the wheel, 7, will alternately be ahead of and behind the wheel, 8, there will be what might be called a continuous average equality and the ship's speed and total run will be correctly indicated at the various stations supplied through the motor, 1.

As shown my invention includes a means for reducing the see-saw motion of the rheostat arm, 17, which is caused by the fact that the wheel, 8, moves by steps and the wheel, 7, continuously. The shaft, 14, is divided at a point, 53, between the worm gear wheel, 5, and the rheostat arm, 17, and discs, 42 and 44, are mounted on the two ends. The disc, 42, fast on the shaft, 14, has a sector or slot at one point as shown at 43, and the disc, 44, has a pin mounted in it in such a position as to register in the sector, 43, and permit the disc, 44, to drive the disc, 42, backward and forward with a certain amount of lost motion. Thus when the bevel gear wheel, 7, is moving the shaft, 14, the pin, 45, will be in the position shown, the motor, 1, running too fast under this condition. When now the increase of the portion of the resistance, 18, connected in the circuit of the motor becomes sufficient to slow down the motor, the left hand portion of the shaft, 14, is no longer moved by the bevel gear wheel, 7, and the motor may drop behind the proper speed and the right hand portion of the shaft, 14, will then be moved by the bevel gear wheel, 8, but in the opposite direction. But on account of the lost motion in the slot, 43, the disc, 42, and the position of the arm, 17, will not be affected until the pin, 45, has moved to the other side of the slot. Since the movement of the wheel, 8, is intermittent it will move faster than the average for short periods and then rest and the width of the slot, 43, may be so proportioned that the pin, 45, will not reach the opposite side of the slot, 43, from that shown until one fast period is past so that the pin may under steady conditions start to pass back towards the position shown before actually touching the other side, and so on until the motor goes on the average too fast or too slow when the pin will gradually move its average position to the right or to the left until the rheostat is readjusted.

When great sensitiveness is required the slot, 43, will be short and the pin, 45, will be moved a certain amount on each speeding-up of the wheel, 8, but when this is not necessary the slot may be lengthened and the rheostat be moved only when the motor has actually accumulated a position ahead of normal: by this means much wear on the rheostat, 4, may be saved. The same action of smoothing the operation with lost motion may be secured by other constructions.

Thus it appears that my invention in effect balances the speed of a working system against the speed of a controlling system in such a way that any departure of the speed of the work system from proper proportionality to that of the control system automatically corrects the speed of the work system, and this may be done without any disturbance of the operation of the control system therefrom, which as a matter of fact may be of a very delicate and sensitive nature. Since, in some cases the control system has an intermittent operation while the work system has a steady motion, it is necessary to have what I may call a running average balance between the two systems, so that the speed of the work system is kept equal or in the proper relation to the quotient of the aggregate distance covered by the control system in a brief interval of time divided by the time, which is an average velocity for that brief period. The next period may bring a different average velocity and so one. By properly choosing the length of this brief period of time over which the average is taken, the variations from perfect proportionality in the two systems may be made as small as desired. On the other hand where more approximate results are satisfactory this period may be lengthened materially with some simplification in the apparatus. This time period under consideration may be changed by the design of the rheostat to give a wider swing of resistance for a given movement of the differential, by more rapid operation of the wheels, 7 and 8, and by other changes in design which will be evident to the designer.

While I have shown many specific mechanical and electrical expedients in illustrating my invention, I wish it understood that the invention is not limited to these details as there are many equivalents that may be substituted for particular elements and I wish to claim all systems which use my apparatus or equivalent apparatus to produce the results I have outlined by substantially equivalent means.

I claim as my invention:

1. In a system in which the operation of a work system is controlled by a separate master system through a differential gear mechanism the master system operating through intermittent impulses, two opposed gears acting between said systems and at least one pinion cooperating therewith, means for deriving alternating corrective movements from said pinion and means for applying said movements to control the speed of said work system, together with means located between said pinion and said means for applying for reducing the amplitude of the oscillations in the corrective movements, before applying them to the work system control means.

2. In a system in which the operation of a work apparatus is controlled by a separate master system through a differential gear mechanism, the master system operating through intermittent impulses, two opposed gears acting between said systems and at least one pinion cooperating therewith, means for deriving alternating corrective movements from said pinion, and means for applying said movement to control the speed of said work apparatus, together with means for reducing the amplitude of the oscillations in the corrective movements, before applying them to the work apparatus control means, said last named means including a certain lost motion, whereby a predetermined limit is set to the minimum operative corrective movement.

K. ARNOLD HOLST.